United States Patent
Satou

(10) Patent No.: US 11,428,462 B2
(45) Date of Patent: Aug. 30, 2022

(54) APPARATUS FOR CALCULATING TEMPERATURE SETTING, SYSTEM FOR LOW TEMPERATURE TREATMENT, METHOD OF CALCULATING TEMPERATURE SETTING, AND PROGRAM FOR CALCULATING TEMPERATURE SETTING

(71) Applicant: DAIKIN INDUSTRIES, LTD., Osaka (JP)

(72) Inventor: Kiichirou Satou, Osaka (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 0 days.

(21) Appl. No.: 17/593,262

(22) PCT Filed: Mar. 18, 2020

(86) PCT No.: PCT/JP2020/012092
§ 371 (c)(1),
(2) Date: Sep. 14, 2021

(87) PCT Pub. No.: WO2020/189733
PCT Pub. Date: Sep. 24, 2020

(65) Prior Publication Data
US 2022/0099362 A1    Mar. 31, 2022

(30) Foreign Application Priority Data

Mar. 19, 2019 (JP) .............................. JP2019-052014
Mar. 12, 2020 (JP) .............................. JP2020-042822

(51) Int. Cl.
*F25D 29/00* (2006.01)
*G01K 13/00* (2021.01)

(52) U.S. Cl.
CPC .......... *F25D 29/005* (2013.01); *G01K 13/00* (2013.01); *F25B 2700/02* (2013.01);
(Continued)

(58) Field of Classification Search
CPC ...... F25D 11/003; F25D 29/00; F25D 29/005; F25D 2500/04; F25D 2600/06;
(Continued)

(56) References Cited

U.S. PATENT DOCUMENTS 6,976,368 B1    12/2005   Lamstaes et al.
7,905,100 B2    3/2011    Thybo et al.
(Continued)

FOREIGN PATENT DOCUMENTS

EP    3015803      5/2016
JP    H11-044475   2/1999
(Continued)

OTHER PUBLICATIONS

International Search Report dated May 26, 2020, issued to PCT/JP2020/012092.
(Continued)

*Primary Examiner* — Jonathan Bradford
(74) *Attorney, Agent, or Firm* — IPUSA, PLLC

(57) ABSTRACT

A set temperature calculating apparatus, a low temperature treatment system, a set temperature calculating method, and a set temperature calculating program are provided for realizing a low temperature treatment. The set temperature calculating apparatus includes: a first obtaining unit configured to obtain data correlating with a heat load in a container storage; a second obtaining unit configured to obtain a set temperature when performing temperature control in the container storage; and a learning unit configured to learn a cargo core temperature in the container storage according to
(Continued)

a data set including a combination of the data correlating with the heat load and the set temperature.

14 Claims, 10 Drawing Sheets

(52) U.S. Cl.
CPC ... *F25B 2700/195* (2013.01); *F25B 2700/197* (2013.01); *F25B 2700/2104* (2013.01); *F25B 2700/2106* (2013.01); *F25B 2700/2116* (2013.01); *F25B 2700/2117* (2013.01); *F25D 2500/04* (2013.01); *F25D 2600/06* (2013.01); *F25D 2700/10* (2013.01); *F25D 2700/123* (2013.01); *F25D 2700/14* (2013.01)

(58) Field of Classification Search
CPC ............ F25D 2700/10; F25D 2700/12; F25D 2700/123; F25D 2700/14; F25D 2700/16; F25B 2700/02; F25B 2700/197; F25B 2700/2104; F25B 2700/2106; F25B 2700/2117
See application file for complete search history.

(56) References Cited

U.S. PATENT DOCUMENTS

| | | | |
|---|---|---|---|
| 10,215,481 B2 | 2/2019 | Satou et al. | |
| 2006/0218960 A1* | 10/2006 | Furlanetto | G05B 13/027 62/342 |
| 2009/0025410 A1* | 1/2009 | Tanaka | F25B 49/022 62/428 |
| 2018/0340729 A1* | 11/2018 | Sugar | G08B 21/182 |
| 2019/0078833 A1 | 3/2019 | Graziano | |

FOREIGN PATENT DOCUMENTS

| | | |
|---|---|---|
| JP | 2001-255060 | 9/2001 |
| JP | 2003-515092 | 4/2003 |
| JP | 2006-234365 | 9/2006 |
| JP | 2016-003815 | 1/2016 |
| WO | 2015/165937 | 11/2015 |

OTHER PUBLICATIONS

International Preliminary Report on Patentability for PCT/JP2020/012092 dated Sep. 30, 2021.
Sorensen Kresten K et al: "Adaptive MPC for a reefer container", Control Engineering Practice, Pergamon Press, Oxford, GB, vol. 44, Aug. 3, 2015 (Aug. 3, 2015), pp. 55-64, XP029307696, ISSN: 0967-0661, DOI: 10.1016/J.CONENGPRAC.2015.05.012.
Badia-Melis Ricardo et al: "Data estimation methods for predicting temperatures of fruit in refrigerated containers", Biosystems Engineering, Elsevier, Amsterdam, NL, vol. 151, Oct. 6, 2016 (Oct. 6, 2016), pp. 261-272, XP029820587, ISSN: 1537-5110, DOI: 10.1016/J.BIOSYSTEMSENG.2016.09.009.
Extended European Search Report dated Apr. 25, 2022 with respect to the corresponding European patent application No. 20774760.1.

* cited by examiner

| TIME DATA | SUCTION TEMPERATURE DATA | HUMIDITY DATA | DISCHARGE TEMPERATURE DATA | EVAPORATOR TEMPERATURE DATA | EVAPORATOR PRESSURE DATA | OUTSIDE AIR TEMPERATURE DATA | OUTSIDE AIR HUMIDITY DATA | CONDENSER TEMPERATURE DATA | CONDENSER PRESSURE DATA | CARGO CORE TEMPERATURE DATA | EXTERNAL TEMPERATURE DATA | EXTERNAL HUMIDITY DATA | OPENING OR CLOSING INFORMATION | SET TEMPERATURE |
|---|---|---|---|---|---|---|---|---|---|---|---|---|---|---|
| | | | | | | | | | | | | | | |
| | | | | | | | | | | | | | | |
| | | | | | | | | | | | | | | |
| | | | | | | | | | | | | | | |
| | | | | | | | | | | | | | | |

4b (410) — INFORMATION FOR LEARNING

| TIME DATA | DISCHARGE TEMPERATURE DATA | HUMIDITY DATA | OUTSIDE AIR TEMPERATURE DATA | OUTSIDE AIR HUMIDITY DATA | INTERNAL VENTILATION VOLUME DATA | CARGO CORE TEMPERATURE DATA | SET TEMPERATURE |
|---|---|---|---|---|---|---|---|
| | | | | | | | |
| | | | | | | | |
| | | | | | | | |
| | | | | | | | |
| | | | | | | | |

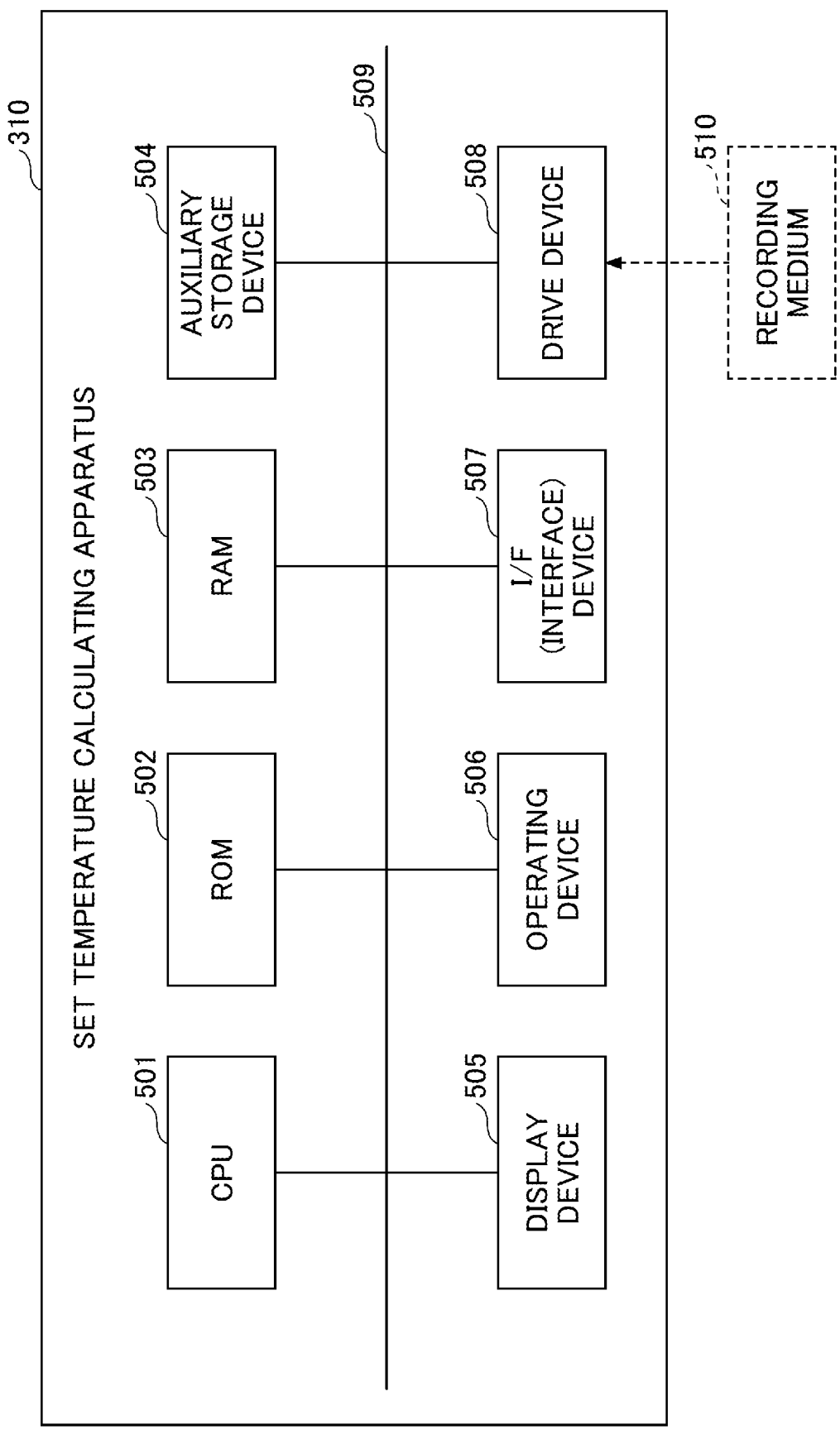

APPARATUS FOR CALCULATING TEMPERATURE SETTING, SYSTEM FOR LOW TEMPERATURE TREATMENT, METHOD OF CALCULATING TEMPERATURE SETTING, AND PROGRAM FOR CALCULATING TEMPERATURE SETTING

TECHNICAL FIELD

The present disclosure relates to an apparatus for calculating temperature setting, a system for low temperature treatment, a method of calculating temperature setting, and a program for calculating temperature setting.

BACKGROUND ART

Conventionally, when fruits such as lemons and grapefruits are marine-transported, a low temperature treatment is performed to exterminate the eggs of pests (Mediterranean fruit flies, etc.) in the fruits are treated in accordance with quarantine regulations. Specifically, temperature control is performed so that the cargo core temperature (the center temperature of fruit that is a cargo) is equal to or less than a reference temperature for a predetermined period.

RELATED-ART DOCUMENTS

Patent Document

[Patent Document 1] Japanese Laid-Open Patent Publication No. 2016-3815

SUMMARY OF THE INVENTION

Problem to be Solved by the Invention

On the other hand, because the heat load of a container storage during marine transport changes greatly, it is impossible to realize a low temperature treatment in accordance with quarantine regulations unless the set temperature is properly changed in accordance with the change in the heat load.

The present disclosure provides a set temperature calculating apparatus, a low temperature treatment system, a set temperature calculating method, and a set temperature calculating program for realizing a low temperature treatment.

Means to Solve the Problem

According to a first aspect of the present disclosure, a set temperature calculating apparatus includes:
 a first obtaining unit configured to obtain data correlating with a heat load in a container storage;
 a second obtaining unit configured to obtain a set temperature when performing temperature control in the container storage; and
 a learning unit configured to learn a cargo core temperature in the container storage according to a data set including a combination of the data correlating with the heat load and the set temperature.

According to the first aspect of the present disclosure, it is possible to provide a set temperature calculating apparatus for realizing a low temperature treatment.

According to a second aspect, the set temperature calculating apparatus according to the first aspect further includes:
 a changing unit configured to change, based on a difference between a cargo core temperature in the container storage inferred by inputting data correlating with a heat load in the container storage and a predetermined set temperature to a result of learning by the learning unit and a target temperature of the cargo core temperature in the container storage based on a low temperature treatment condition, the predetermined set temperature.

According to a third aspect, in the set temperature calculating apparatus according to the second aspect,
 the data correlating with the heat load includes any of temperature data and humidity data in the container storage, a ventilation volume in the container storage, and outside air temperature data and outside air humidity data outside the container storage.

According to a fourth aspect, in the set temperature calculating apparatus according to the third aspect,
 the temperature data and the humidity data in the container storage are output by a suction temperature sensor, a discharge temperature sensor, and a humidity sensor installed on a refrigerator included by the container storage.

According to a fifth aspect, in the set temperature calculating apparatus according to the third aspect,
 the temperature data in the container storage is calculated based on temperature data and pressure data output by a temperature sensor and a pressure sensor installed on an evaporator of a refrigerator included by the container storage.

According to a sixth aspect, in the set temperature calculating apparatus according to the third aspect,
 the outside air temperature data and the outside air humidity data outside the container storage are output by an outside air temperature sensor and an outside air humidity sensor installed on a refrigerator included by the container storage or an outside air temperature sensor and an outside air humidity sensor installed separately from the refrigerator included by the container storage.

According to a seventh aspect, in the set temperature calculating apparatus according to the third aspect,
 the outside air temperature data outside the container storage is calculated based on temperature data and pressure data output by a temperature sensor and a pressure sensor installed on a condenser of a refrigerator included by the container storage.

According to an eighth aspect, a low temperature treatment system includes:
 the set temperature calculating apparatus according to any one of the second to seventh aspects; and
 a control apparatus configured to control a refrigerator included by the container storage so as to make a temperature in the container storage closer to the set temperature changed by the changing unit.

According to the eighth aspect of the present disclosure, it is possible to provide a low temperature treatment system for realizing a low temperature treatment.

According to a ninth aspect, the set temperature calculating system according to the eighth further includes:
 a reporting unit configured to report abnormality when the cargo core temperature in the container storage does not change, even after a predetermined time has elapsed since control was started by the control apparatus so as to make the temperature in the container storage closer to the set temperature changed by the changing unit.

According to a tenth aspect, in the set temperature calculating apparatus according to the eighth aspect, the refrigerator includes a refrigerant circuit including a compressor, a condenser, an expansion mechanism, and an evaporator; a suction temperature sensor; a discharge temperature sensor; a humidity sensor; an outside air temperature sensor; an outside air humidity sensor; and a cargo core temperature sensor.

According to an eleventh aspect of the present disclosure, a set temperature calculating method includes:

a first obtaining step of obtaining data correlating with a heat load in a container storage;

a second obtaining step of obtaining a set temperature when performing temperature control in the container storage; and a learning step of learning a cargo core temperature in the container storage according to a data set including a combination of the data correlating with the heat load and the set temperature.

According to the eleventh aspect of the present disclosure, it is possible to provide a set temperature calculating method for realizing a low temperature treatment.

According to a twelfth aspect, the set temperature calculating method according to the eleventh aspect further includes:

a changing step of changing, based on a difference between a cargo core temperature in the container storage inferred by inputting data correlating with a heat load in the container storage and a predetermined set temperature to a result of learning by the learning unit and a target temperature of the cargo core temperature in the container storage based on a low temperature treatment condition, the predetermined set temperature.

According to a thirteenth aspect of the present disclosure, a set temperature calculating program causes a compute to execute:

a first obtaining step of obtaining data correlating with a heat load in a container storage;

a second obtaining step of obtaining a set temperature when performing temperature control in the container storage; and a learning step of learning a cargo core temperature in the container storage according to a data set including a combination of the data correlating with the heat load and the set temperature.

According to the thirteenth aspect of the present disclosure, it is possible to provide a set temperature calculating program for realizing a low temperature treatment.

According to a fourteenth aspect, the set temperature calculating program according to the thirteenth aspect further includes:

a changing step of changing, based on a difference between a cargo core temperature in the container storage inferred by inputting data correlating with a heat load in the container storage and a predetermined set temperature to a result of learning by the learning unit and a target temperature of the cargo core temperature in the container storage based on a low temperature treatment condition, the predetermined set temperature.

BRIEF DESCRIPTION OF DRAWINGS

FIG. 4 is a diagram illustrating an example of a data list obtained in the low temperature treatment system;

FIG. 5 is a diagram illustrating an example of a hardware configuration of a set temperature calculating apparatus;

MODE FOR CARRYING OUT THE INVENTION

In the following, embodiments will be described with reference to the accompanying drawings. In the specification and drawings, elements having substantially the same functional configurations are referred to by the same numerals, and a duplicate description thereof will be omitted.

First Embodiment

<Outline of Low Temperature Treatment>

Figure 1:
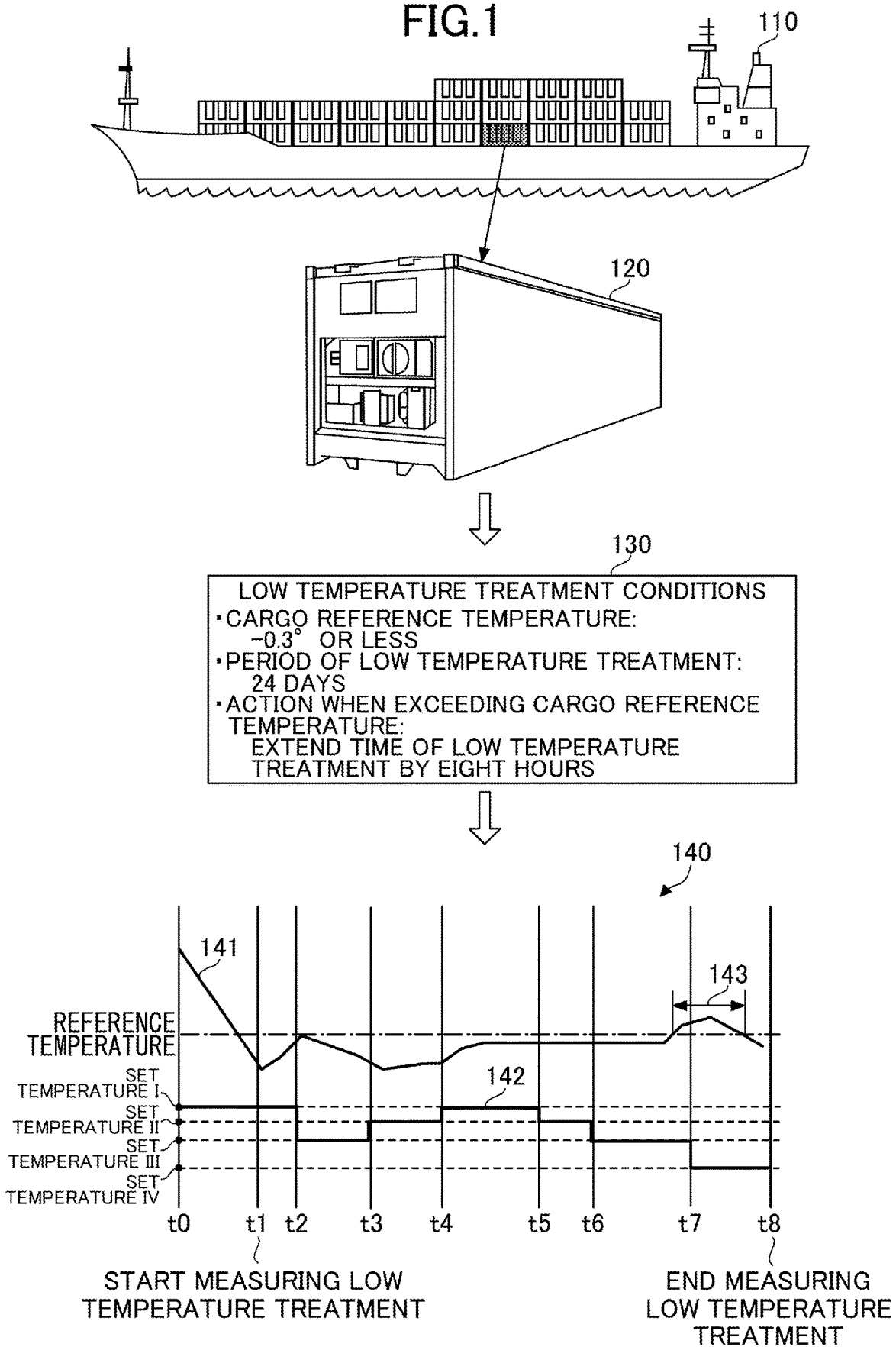
FIG. 1 is a diagram for explaining an outline of a low temperature treatment.

First, an outline of a low temperature treatment that is realized by a low temperature treatment system according to a first embodiment will be described. FIG. 1 is a diagram for explaining an outline of a low temperature treatment.

Generally, fruits such as lemons and grapefruits are marine-transported by a container ship 110 as illustrated in FIG. 1. A plurality of container storages are loaded on the container ship 110. For each of the container storages (for example, container storages 120), the temperature in the container storage (for example, the container storage 120) is controlled by a refrigerator.

Here, when fruits are stored in a container storage and transported by sea, a low temperature treatment is performed to exterminate the eggs of pests (for example, Mediterranean fruit flies) in the fruits in accordance with quarantine regulations.

The example of FIG. 1 indicates, as defined low temperature treatment conditions 130 when the low temperature treatment is performed, that:

Cargo reference temperature: −0.3° or less;

Period of low temperature treatment: 24 days; and

Action when exceeding the cargo reference temperature: extend the time of the low temperature treatment by eight hours.

On the other hand, in FIG. 1, a graph 140 indicates the temperature in the container actually controlled so as to satisfy the low temperature treatment conditions 130. In the graph 140, the horizontal axis represents time and the vertical axis represents temperature. Also, a line 141 indicates the transition of cargo core temperature data, and a line 142 indicates the change history of the set temperature.

In the example of FIG. 1, with the time point at which the cargo core temperature data (line 141) decreases by a predetermined temperature or more with respect to a reference temperature (time $t_1$) as a start point, measurement of the period of the low temperature treatment is started. In the example illustrated in FIG. 1, after the measurement of the period of the low temperature treatment was started, the set temperature was changed a plurality of times (refer to the history of the change of the set temperature (line 142)). Specifically, the set temperature has been changed at times $t_2$, $t_3$, $t_4$, $t_5$, $t_6$, and $t_7$.

This is because in the case of the container storage 120 loaded on the container ship 110, the cargo core temperature data is not constant even if temperature control in the container storage is performed by fixing the set temperature because the heat load changes significantly during marine transport. For this reason, conventionally, for example, a crew member monitors the cargo core temperature data and perform an operation such as lowering the set temperature when the reference temperature is about to be exceeded. However, if the crew member mistakenly operates the set temperature, the reference temperature may be exceeded and a low temperature treatment in accordance with quarantine regulations may not be realized.

In the example of FIG. 1, a reference numeral 143 indicates that the cargo core temperature data has exceeded the reference temperature. In such a case, the low temperature treatment conditions 130 increase the period of the low temperature treatment by 8 hours.

Here, the low temperature treatment system according to the first embodiment is configured to replace and automate an operation by a crew member, avoid a situation as described above, and be able to set an appropriate set temperature for a refrigerator in accordance with the change in heat load. Hereinafter, details of the low temperature treatment system according to the first embodiment will be described.

<Configuration Example of Container Storage>

Figure 2:
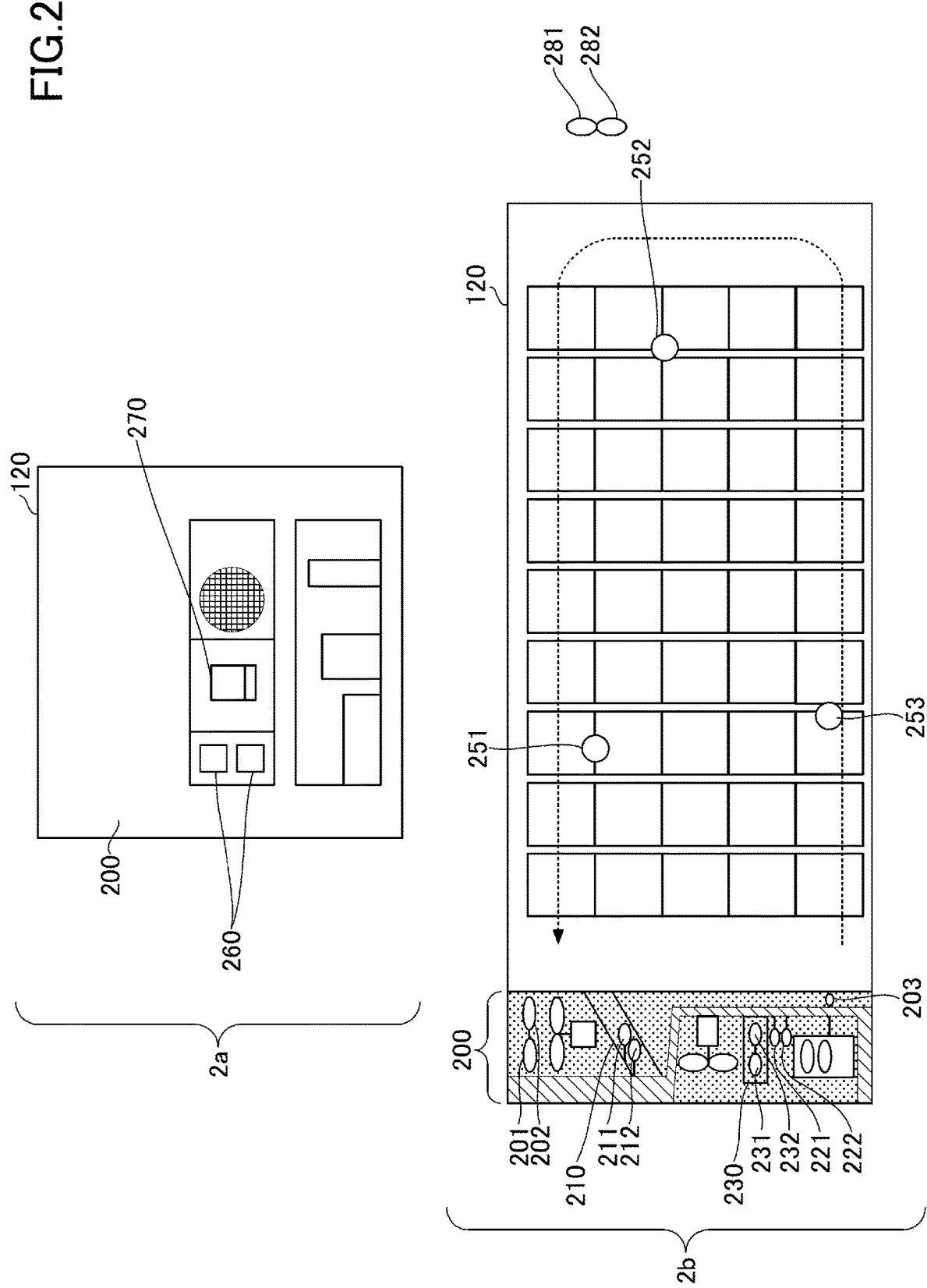
FIG. 2 is a diagram illustrating a configuration example of a container storage.

First, a configuration of the container storage 120, which is included in the low temperature treatment system according to the first embodiment, will be described. FIG. 2 is a diagram illustrating a configuration example of the container storage. Here, 2a of FIG. 2 is a schematic view illustrating the container storage 120 when viewed from the front.

As illustrated in 2a of FIG. 2, a refrigerator 200 is disposed on the front side of the container storage 120. Although various devices are attached to the front surface of the refrigerator 200, in the example of 2a of FIG. 2, a refrigerator display apparatus 270 and a ventilation window 260 are clearly illustrated.

Here, 2b of FIG. 2 is a cross-sectional view of the container storage 120. As illustrated in 2b of FIG. 2, a suction temperature sensor 201, a humidity sensor 202, and a discharge temperature sensor 203 are attached to the refrigerator 200 disposed in the container storage 120. Also, the refrigerator 200 includes an evaporator 210, and an evaporator temperature sensor 211 and an evaporator pressure sensor 212 are attached to the evaporator 210.

Also, an outside air temperature sensor 221 and an outside air humidity sensor 222 are attached to the refrigerator 200. In addition, the refrigerator 200 includes a condenser 230, and a condenser temperature sensor 231 and a condenser pressure sensor 232 are attached to the condenser 230.

On the other hand, cargo core temperature sensors 251 to 253 are disposed within the container storage 120. Further, an external temperature sensor 281 and an external humidity sensor 282 are attached outside the container storage 120.

<System Configuration of Low Temperature Treatment System (Learning Phase)>

Next, a system configuration of the low temperature treatment system in a learning phase will be described. In the learning phase, a crew member operates the set temperature while monitoring the cargo core temperature data as conventionally, and the low temperature treatment system collects information for learning.

Figure 3:
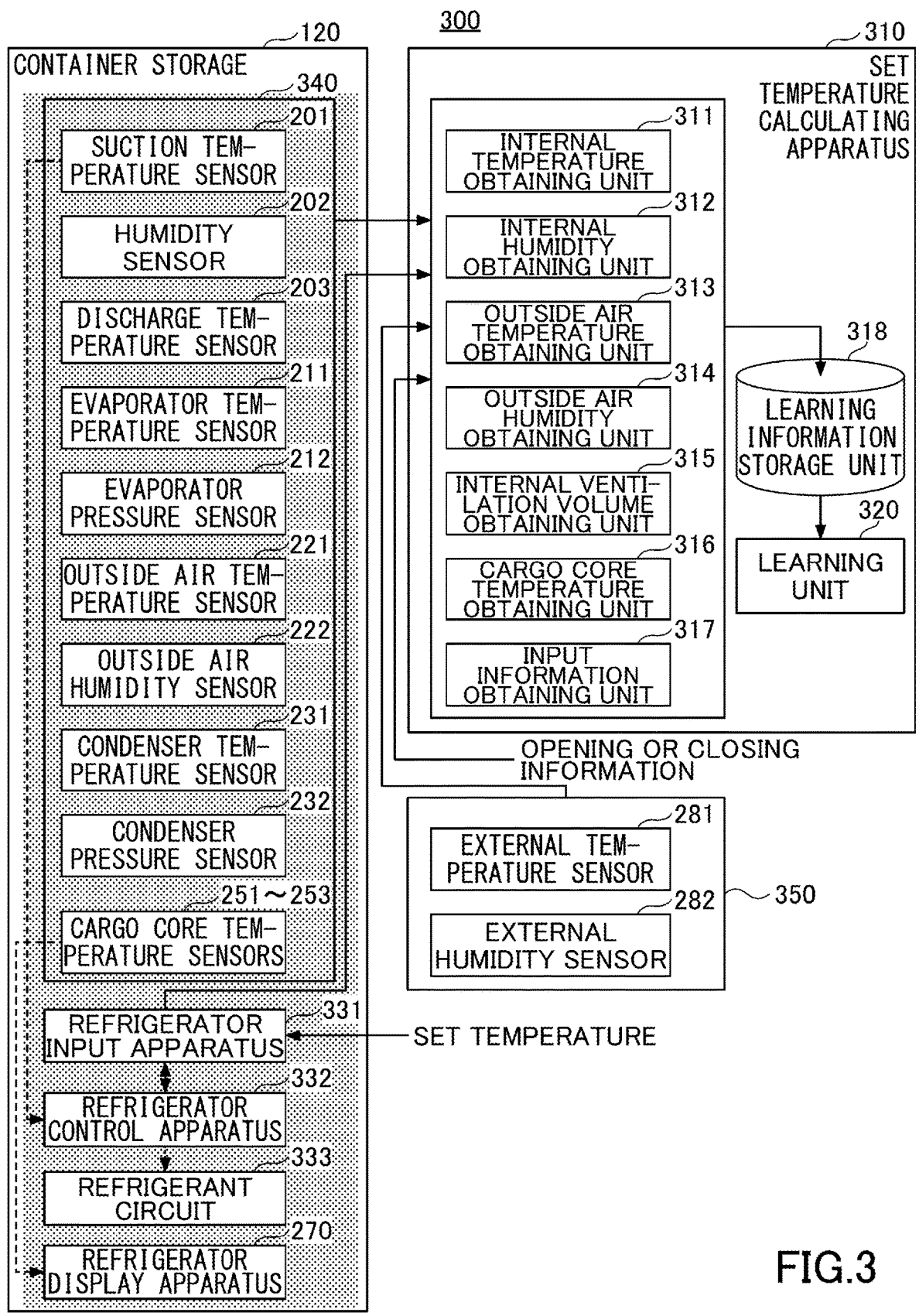
FIG. 3 is a diagram illustrating an example of a system configuration of a low temperature treatment system in a learning phase.

FIG. 3 is a diagram illustrating an example of the system configuration of the low temperature treatment system in the learning phase. As illustrated in FIG. 3, a low temperature treatment system 300 includes the container storage 120, a set temperature calculating apparatus 310, and an external sensor group 350. Since the respective sensors included in the external sensor group 350 have been described with reference to FIG. 2, the description thereof is omitted here.

The refrigerator 200 of the container storage 120 includes a container storage sensor group 340, a refrigerator input apparatus 331, a refrigerator control apparatus 332, a refrigerant circuit 333, and a refrigerator display apparatus 270. Among these, the respective sensors included in the container storage sensor group 340 have been described above with reference to FIG. 2, and thus the description thereof is omitted here.

The refrigerator input apparatus 331 receives the set temperature of the refrigerator 200 input by a crew member of the container ship 110. The refrigerator input apparatus 331 transmits the received set temperature to the set temperature calculating apparatus 310 and to set the received set temperature in the refrigerator control apparatus 332.

The refrigerator control apparatus 332 controls the refrigerant circuit 333 so as to make the suction temperature data output from the suction temperature sensor 201 closer to the set temperature.

The refrigerant circuit 333 includes a compressor, a condenser, an expansion mechanism, and an evaporator to control the temperature within the container storage 120 by circulating a refrigerant.

The refrigerator display apparatus 270 displays cargo core temperature data output from the cargo core temperature sensors 251 to 253.

A set temperature calculating program is installed in the set temperature calculating apparatus 310. The set temperature calculating apparatus 310 functions as an internal temperature obtaining unit 311, an internal humidity obtaining unit 312, an outside air temperature obtaining unit 313, and an outside air humidity obtaining unit 314 by executing the program in the learning phase. Also, the set temperature calculating apparatus 310 functions as an internal ventilation volume obtaining unit 315, a cargo core temperature obtaining unit 316, and an input information obtaining unit 317. Further, the set temperature calculating apparatus 310 functions as a learning unit 320.

The internal temperature obtaining unit 311 obtains data correlating with the temperature in the container storage 120. Specifically, the internal temperature obtaining unit 311 obtains either suction temperature data output from the suction temperature sensor 201 or discharge temperature data output from the discharge temperature sensor 203 as the data correlating with the temperature inside the container storage 120.

Alternatively, the internal temperature obtaining unit 311 may obtain the data correlating with the temperature in the container storage 120 based on evaporator temperature data output from the evaporator temperature sensor 211 and evaporator pressure data output from the evaporator pressure sensor 212.

Also, the internal temperature obtaining unit 311 stores, as information for learning, the obtained data correlating with the temperature in the container storage 120 in the learning information storage unit 318 in association with the time information.

The internal humidity obtaining unit 312 obtains data correlating to the humidity in the container storage 120. Specifically, the internal humidity obtaining unit 312 obtains humidity data output from the humidity sensor 202 as the data correlating with the humidity in the container storage 120.

Also, the internal humidity obtaining unit 312 stores, as information for learning, the obtained data correlating with the humidity in the container storage 120 in the learning information storage unit 318 in association with the time information.

The outside air temperature obtaining unit 313 obtains data correlating with the temperature of the outside air of the container storage (for example, outside of the container storage 120). Specifically, the outside air temperature obtaining unit 313 obtains outside air temperature data output from the outside air temperature sensor 221. Alternatively, the outside air temperature obtaining unit 313 may obtain external temperature data output from the external temperature sensor 281. Alternatively, the outside air temperature obtaining unit 313 may obtain data correlating with the temperature of the outside air of the container storage 120 based on the condenser temperature data output from the condenser temperature sensor 231 and the condenser pressure data output from the condenser pressure sensor 232.

The outside air temperature obtaining unit 313 stores, as information for learning, the obtained data correlating with the temperature of the outside air of the container storage 120 in the learning information storage unit 318 in association with the time information.

The outside air humidity obtaining unit 314 obtains data correlating with the humidity of the outside air of the container storage 120. Specifically, the outside air humidity obtaining unit 314 obtains the data correlating with the humidity of the outside air of the container storage 120 based on the outside air humidity data output from the outside air humidity sensor 222 or the external humidity data output from the external humidity sensor 282.

The outside air humidity obtaining unit 314 stores, as information for learning, the obtained data correlating with the humidity of the outside air of the container storage 120 in the learning information storage unit 318 in association with the time information.

The internal ventilation volume obtaining unit 315 obtains data correlating with the ventilation volume in the container storage 120. Specifically, the internal ventilation volume obtaining unit 315 receives the input of the opening or closing information of the ventilation window 260 attached to the front side of the container storage 120 to derive the ventilation volume. For example, the internal ventilation volume obtaining unit 315 obtains the ventilation volume="zero" when the ventilation window 260 is in the closed state. Meanwhile, the internal ventilation volume obtaining unit 315 obtains the ventilation volume "predetermined value" when the ventilation window 260 is in the open state. The internal ventilation volume obtaining unit 315 may be configured to obtain the ventilation volume corresponding to the degree of opening or closing of the ventilation window 260.

The internal ventilation volume obtaining unit 315 stores, as information for learning, the data correlating with the ventilation volume in the obtained container storage 120 in the learning information storage unit 318 in association with the time information.

The cargo core temperature obtaining unit 316 obtains data correlating with the cargo core temperature. Specifically, the cargo core temperature obtaining unit 316 obtains the cargo core temperature data output from the cargo core temperature sensors 251 to 253.

The cargo core temperature obtaining unit 316 stores, as information for learning, the obtained data correlating with the cargo core temperature in the learning information storage unit 318 in association with the time information.

The input information obtaining unit 317 obtains the set temperature received by the refrigerator input apparatus 331. As described above, in a case of the container storage 120 loaded on the container ship 110, because the heat load changes significantly during marine transport, a crew member changes the set temperature frequently in the learning phase (see the line 142 of the graph 140 in FIG. 1). The input information obtaining unit 317 obtains the latest set temperature every time the crew member changes the set temperature.

The input information obtaining unit 317 stores, as information for learning, the obtained set temperature in the learning information storage unit 318 in association with the time information.

The learning unit 320 performs machine learning on a model (cargo core temperature model) for inferring the cargo core temperature based on information for learning stored in the learning information storage unit 318. Thus, the learning unit 320 generates a learned cargo core temperature model for inferring the cargo core temperature. Details are given below.

<Data List Obtained in Low Temperature Treatment System>

Next, a list of data obtained in the low temperature treatment system 300 in the learning phase will be described. FIG. 4 is a diagram illustrating an example of the list of data obtained in the low temperature treatment system. Here, 4a of FIG. 4 indicates a list 400 of data received by the set temperature calculating apparatus 310.

As illustrated in the list 400 of data at 4a of FIG. 4, the set temperature calculating apparatus 310 receives data output from the suction temperature sensor 201, the humidity sensor 202, the discharge temperature sensor 203, the evaporator temperature sensor 211, and the evaporator pressure sensor 212 in association with the time data.

Also, the set temperature calculating apparatus 310 receives data output from the outside air temperature sensor 221, the outside air humidity sensor 222, the condenser temperature sensor 231, the condenser pressure sensor 232, and the cargo core temperature sensors 251 to 253 in association with the time data.

Also, the set temperature calculating apparatus 310 receives data output from the external temperature sensor 281 and the external humidity sensor 282, received opening or closing information, and the set temperature output from the compressor input apparatus 331 in association with the time data.

Meanwhile, as described above, each unit of the set temperature calculating apparatus 310 stores, as information for learning, data derived based on the received data or a part of the received data in the learning information storage unit 318.

As the learning information 410, the example of 4b of FIG. 4 indicates:
- data correlating with the temperature in the container storage 120 (referred to as "internal temperature data", for example, discharge temperature data obtained by the internal temperature obtaining unit 311);
- data correlating the humidity in the container storage 120 (referred to as "internal humidity data", for example, humidity data obtained by the internal humidity obtaining unit 312);
- data correlating with the temperature of the outside air outside the container storage 120 (referred to as "outside air temperature data", for example, outside air temperature data obtained by the outside air temperature obtaining unit 313);
- data correlating the humidity of the outside air outside the container storage 120 (referred to as "outside air humidity data", for example, outside air humidity data obtained by the outside air humidity obtaining unit 314);
- data correlating with the ventilation volume in the container storage 120 (referred to as "internal ventilation volume data", for example, internal ventilation volume data obtained by the internal ventilation volume obtaining unit 315);
- data correlating with the cargo core temperature (referred to as "cargo core temperature data", for example, cargo core temperature data obtained by the cargo core temperature obtaining unit 316); and
- a set temperature set in the refrigerator control apparatus 332 (referred to as "set temperature", set temperature obtained by the input information obtaining unit 317), are stored in the learning information storage. unit 318 in association with the time data. The internal temperature data, the internal humidity data, the outside air temperature data, the outside air humidity data, and the internal ventilation volume data are each data correlating with the heat load in the container storage 120.

<Hardware Configuration of Refrigerator Control Apparatus and Set Temperature Calculating Apparatus>

Next, a hardware configuration of the set temperature calculating apparatus 310 and the refrigerator control apparatus 332 included by the refrigerator 200 disposed on the container storage 120 of the low temperature treatment system 300 will be described. Since the hardware configuration of the refrigerator control apparatus 332 and the hardware configuration of the set temperature calculating apparatus 310 are substantially the same, the hardware configuration of the set temperature calculating apparatus 310 will be described herein.

FIG. 5 is a diagram illustrating an example of the hardware configuration of the set temperature calculating apparatus. As illustrated in FIG. 5, the set temperature calculating apparatus 310 includes a CPU (central processing unit) 501, a ROM (read only memory) 502, and a RAM (random access memory) 503. The CPU 501, the ROM 502, and the RAM 503 together constitute a computer. The set temperature calculating apparatus 310 further includes an auxiliary storage device 504, a display device 505, an operating device 506, an I/F (interface) device 507, and a drive device 508. The individual hardware parts of the set temperature calculating apparatus 150 are connected to one another through a bus 509.

The CPU 501 is an arithmetic device that executes various types of programs (e.g., a set temperature calculating program (learning phase)) installed in the auxiliary storage device 504. The ROM 502 is a nonvolatile memory. The ROM 502, which functions as a main memory device, stores various types of program, data, and the like necessary for the CPU 501 to execute the various types of programs installed in the auxiliary storage device 504. Specifically, the ROM 502 stores boot programs and the like such as BIOS (basic input/output system) and EFI (extensible firmware interface).

The RAM 503 is a volatile memory such as a DRAM (dynamic random access memory) or an SRAM (static random access memory). The RAM 503, which functions as a main memory device, provides a work area to which the various types of program installed in the auxiliary storage device 504 are loaded when executed by the CPU 501.

The auxiliary storage device 504 stores various types of program, and stores information used when the various types of program are executed.

The display device 505 is a display device that displays an internal state of the set temperature calculating apparatus 310. The operating device 506 is an operating device that is used by an administrator of the set temperature calculating apparatus 310 to perform various types of operations with respect to the set temperature calculating apparatus 310, for example. The I/F device 507 is a connection device for connecting to the container storage sensor group 340, the refrigerator input apparatus 331, the external sensor group 350 of the container storage 120 and the like and for receiving data.

The drive device 508 is a device for setting a recording medium 510. Here, the recording medium 510 includes a medium for optically, electrically, or magnetically recording information, such as a CD-ROM, a flexible disk, a magneto-optical disk, or the like. The recording medium 510 may also include a semiconductor memory or the like that electrically records information, such as a ROM, a flash memory, or the like.

The various types of programs to be installed in the auxiliary storage device 504 are installed by the drive device 508 reading the various types of programs recorded in the recording medium 510 upon the recording medium 510 being set in the drive device 508, for example. Alternatively, the various types of program to be installed in the auxiliary storage device 504 may be installed upon being downloaded from a network (not illustrated.

<Functional Configuration of Refrigerator Control Apparatus>

Figure 6:
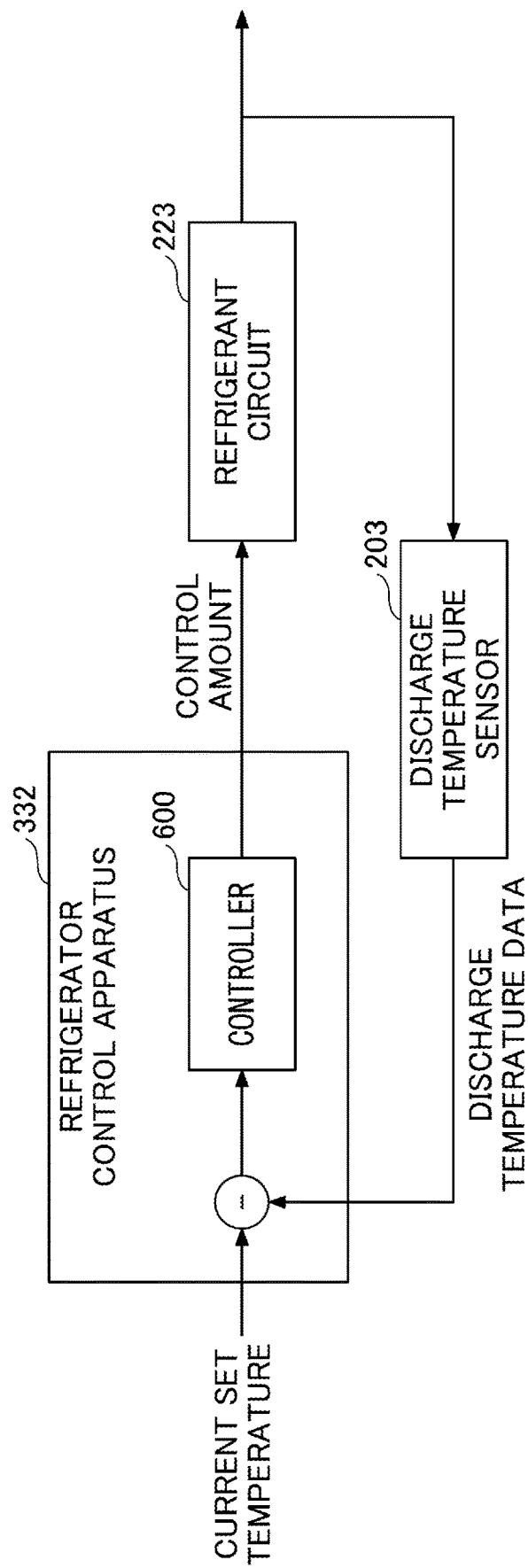
FIG. 6 is a diagram illustrating an example of a functional configuration of a refrigerator control apparatus.

Next, a functional configuration (control blocks) of the refrigerator control apparatus 332 that is included in by the low temperature treatment system 300 will be described. FIG. 6 is a diagram illustrating an example of the functional configuration of the refrigerator control apparatus. As described above, the refrigerator control apparatus 332 receives the current set temperature reported by the refrigerator input apparatus 331.

As illustrated in FIG. 6, the refrigerator control apparatus 332 calculates the difference between the received set temperature and the discharge temperature data output from the discharge temperature sensor 203 (data correlating with the temperature in the container storage 120 (internal temperature data)), and inputs the difference value to the controller 600. The controller 600 may be, for example, a PID controller that calculates a control amount corresponding to a difference value and outputs it to the refrigerant circuit 333.

As illustrated in FIG. 6, the refrigerant circuit 333 operates based on the control amount output by the controller 600 of the refrigerator control apparatus 332. Accordingly, the discharge temperature data of the refrigerator 200 is changed, and the discharge temperature sensor 203 detects the discharge temperature data after being changed and transmits the data to the set temperature calculating apparatus 310.

Thus, the refrigerator control apparatus 332 controls the operation of the refrigerant circuit 333 so as to make the discharge temperature data (data correlating with the temperature in the container storage 120 (the internal temperature data)) of the refrigerator 200 closer to the set temperature reported by the refrigerator input apparatus 331. This enables the refrigerator control apparatus 332 to control the discharge temperature data of the refrigerator 200 (data correlating with the temperature in the container storage 120 (internal temperature data)).

<Functional Configuration of Temperature Calculating Apparatus (Learning Phase)>

Figure 7:
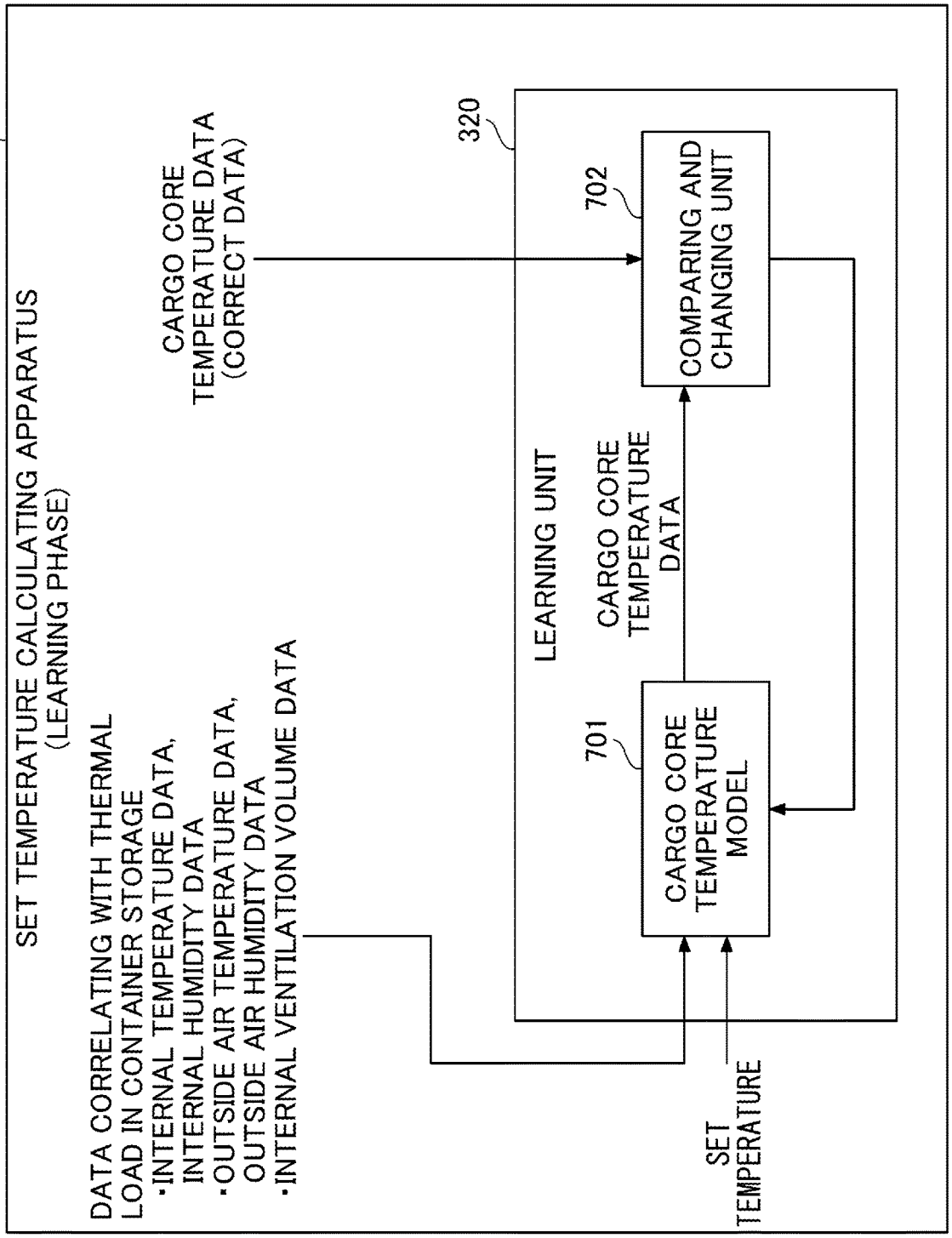
FIG. 7 is a diagram illustrating an example of a functional configuration of the set temperature calculating apparatus in a learning phase.

Next, a functional configuration of the set temperature calculating apparatus. 310 in the learning phase will be described. FIG. 7 is a diagram illustrating an example of the functional configuration of the set temperature calculating apparatus in the learning phase. As illustrated in FIG. 7, the learning unit 320 includes a cargo core temperature model 701 and a comparing and changing unit 702. The learning unit 320 reads out the information for learning from the learning information storage unit 318 and inputs a data set including a combination of data correlating with the heat load in the container storage 120 and the set temperature to the cargo core temperature model 701 among the read-out learning information. Specifically, the learning unit 320 inputs the internal temperature data, the internal humidity data, the outside air temperature data, the outside air humidity data, the internal ventilation volume data, and the set temperature to the cargo core temperature model 701.

Thus, the learning unit 320 executes the cargo core temperature model 701, and the cargo core temperature model 701 outputs the cargo core temperature data.

The cargo core temperature data output from the cargo core temperature model 701 is input to the comparing and changing unit 702. The comparing and changing unit 702 compares the cargo core temperature data output from cargo core temperature model 701; and
the cargo core temperature data (correct data) read out from the learning information storage unit 318.

The comparing and changing unit 702 changes the model parameters of the cargo core temperature model 701 in accordance with the comparison result.

The cargo core temperature data (correct data) compared by the comparing and changing unit 702 is not the cargo core temperature data associated with the same time data as the data set input to the cargo core temperature model 701, but is the cargo core temperature data after a predetermined time. This is because there is a time lag of the predetermined time from when the cargo core temperature data becomes a state specified by the data set (internal temperature data, internal humidity data, outside air temperature data, outside air humidity data, internal ventilation volume data, and set temperature) to when the cargo core temperature data becomes stable under the specified state.

Thus, the learning unit 320 performs machine learning on the cargo core temperature model 701 that specifies the corresponding relationship between a data set that includes a combination of data correlating with the thermal load in the container storage 120 and the set temperature; and
the cargo core temperature data (after the predetermined time).

This enables the learning unit 320 to generate a learned cargo core temperature model for inferring the cargo core temperature data.

The example illustrated by FIG. 7 is a case in which the learning unit 320 inputs the internal temperature data, the internal humidity data, the outside air temperature data, the outside air humidity data, and the internal ventilation volume data to the cargo core temperature model 701 as data correlating with the heat load in the container storage 120. However, the learning unit 320 may input only a portion of these information to the cargo core temperature model 701.

<System Configuration of Low Temperature Treatment System (Inferring Phase)>

Next, a system configuration of the low temperature treatment system in the inferring phase will be described. In the inferring phase, the set temperature inferred by the set temperature calculating apparatus is automatically set to the refrigerator 200.

Figure 8:
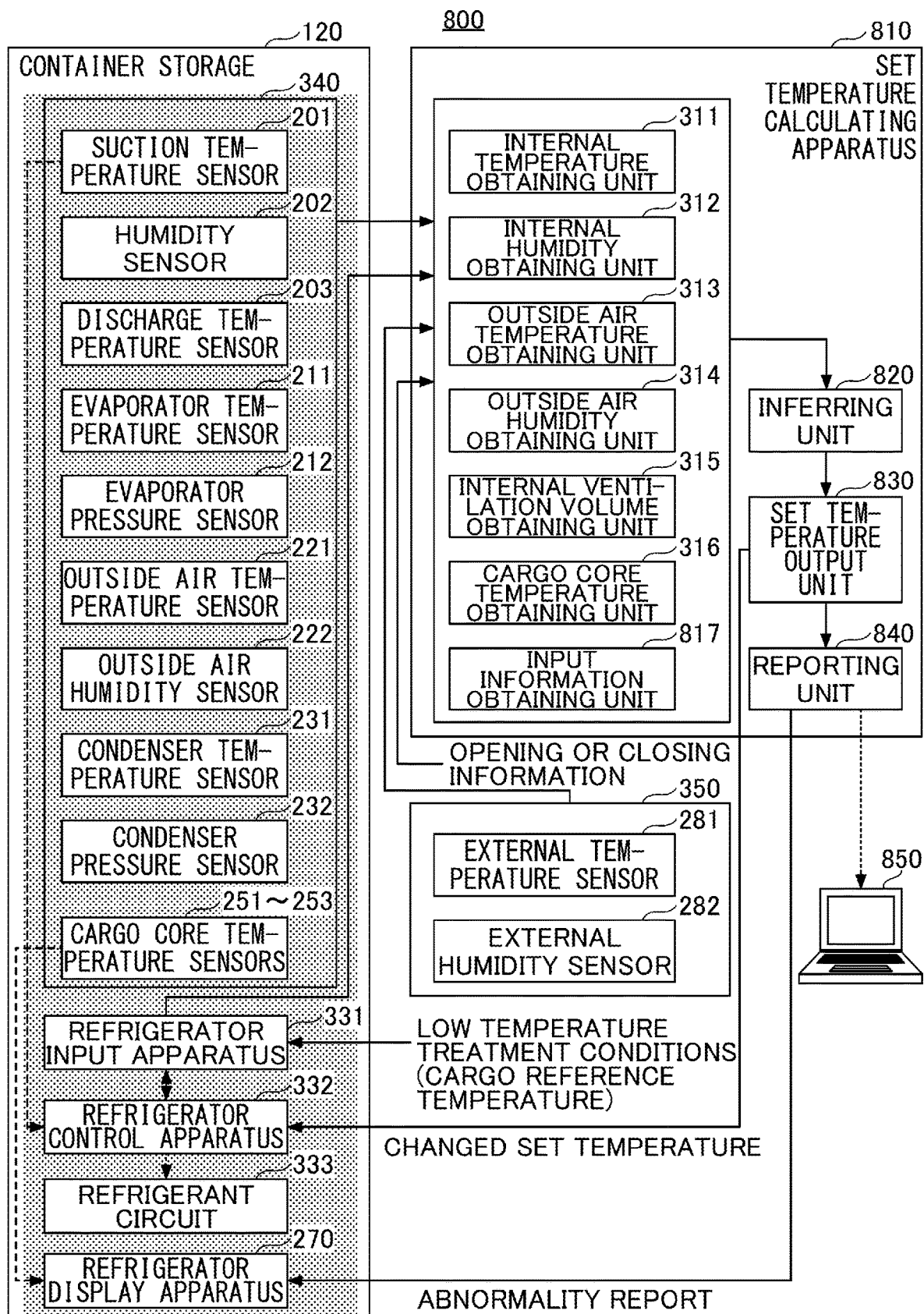
FIG. 8 is a diagram illustrating an example of a system configuration of the low temperature treatment system in an inferring phase.

FIG. 8 is a diagram illustrating an example of the system configuration of the low temperature treatment system in the inferring phase. From the low temperature treatment system 300 (FIG. 3) in the learning phase, the low temperature treatment system 800 in the inferring phase has difference points in that a set temperature calculating apparatus 810 includes an input information obtaining unit 817, an inferring unit 820, a set temperature output unit 830, and a reporting unit 840. Also, the low temperature treatment system 800 in the inferring phase has also a difference point of including a management terminal 850. Further, the low temperature treatment system 800 in the inferring phase has also difference points in that the low temperature treatment conditions 130 are input to the refrigerator input apparatus 331, the set temperature after being changed is input to the refrigerator control apparatus 332, and an abnormality report is input to the refrigerator display apparatus 270.

The set temperature calculating apparatus 810 monitors the data correlating with the thermal load in the container storage 120 and changes the set temperature of the refrigerator 200 so that the inferred cargo core temperature data does not exceed the cargo reference temperature.

A set temperature calculating program (inferring phase) is installed in the set temperature calculating apparatus 810. By the program being executed, the set temperature calculating apparatus 810 functions as an internal temperature obtaining unit 311, an internal humidity obtaining unit 312, an outside air temperature obtaining unit 313, an outside air humidity obtaining unit 314, an internal ventilation volume obtaining unit 315, a cargo core temperature obtaining unit 316, and an input information obtaining unit 817. By the program being executed, the set temperature calculating apparatus 810 functions as an inferring unit 820, a set temperature output unit 830, and a reporting unit 840.

Since the cargo core temperature obtaining unit 316 to the internal temperature obtaining unit 311 have been already described with reference to FIG. 3, the description thereof is omitted here.

The input information obtaining unit 817 obtains the cargo reference temperature among the low temperature treatment conditions 130 input to the refrigerator input apparatus 331. Also, the input information obtaining unit 817 obtains the set temperature currently set in the refrigerator control apparatus e 332 from the refrigerator input apparatus 331. Further, the input information obtaining unit 817 derives the cargo target temperature based on the obtained cargo reference temperature (for example, subtracting a predetermined temperature from the cargo reference temperature to derive the cargo target temperature) and reports the derived temperature to the inferring unit 820 together with the obtained current set temperature.

The inferring unit 820 has a learned cargo core temperature model. The inferring unit 820 obtains data correlating with the thermal load in the container storage 120, the current set temperature, and the cargo target temperature from the respective units of the internal temperature obtaining unit 311 to the input information obtaining unit 817.

The inferring unit 820 performs the learned cargo core temperature model by inputting a data set including a combination of the obtained data correlating with the thermal load in the container storage 120 and the current set temperature to the learned cargo core temperature model. Thus, the inferring unit 820 infers the cargo core temperature data after a predetermined time. Details are given below.

Also, the inferring unit 820 calculates the error between the inferred cargo core temperature data and the obtained cargo target temperature, and change the current, set temperature by backpropagation of the calculated error. Further, the inferring unit 820 reports the set changed set temperature to the set temperature output unit 830.

The set temperature output unit 830 transmits the changed set temperature reported by the inferring unit 820 to the refrigerator control apparatus 332. This enables the refrigerant control apparatus 332 to control the refrigerant circuit 333 based on the changed set temperature so that the cargo core temperature data can be made closer to the cargo target temperature after the predetermined time.

Upon the changed set temperature being reported by the set temperature output unit 830, the reporting unit 840 monitors the cargo core temperature data output from the cargo core temperature sensors 251 to 253 for a predetermined time. The reporting unit 840 determines whether the cargo core temperature data has changed during the predetermined time after the changed set temperature is reported, and when determining that no change has occurred even after the predetermined time, the reporting unit 840 determines that abnormality has occurred in the refrigerator 200. In this case, the reporting unit 840 reports, to the refrigerator display apparatus 270 of the container storage 120, the abnormality. This enables a crew member to be informed of the abnormality in the refrigerator 200. The reporting unit 840 also reports, to the management terminal 850, the abnormality.

The management terminal 850 is a management terminal of the shipping company that owns the container ship 110 and displays when receiving an abnormality report by the reporting unit 840. This enables to report abnormality of the refrigerator 200 to the shipping company owning the container ship 110.

<Details of Functional Configuration of Inferring Unit>

Figure 9:
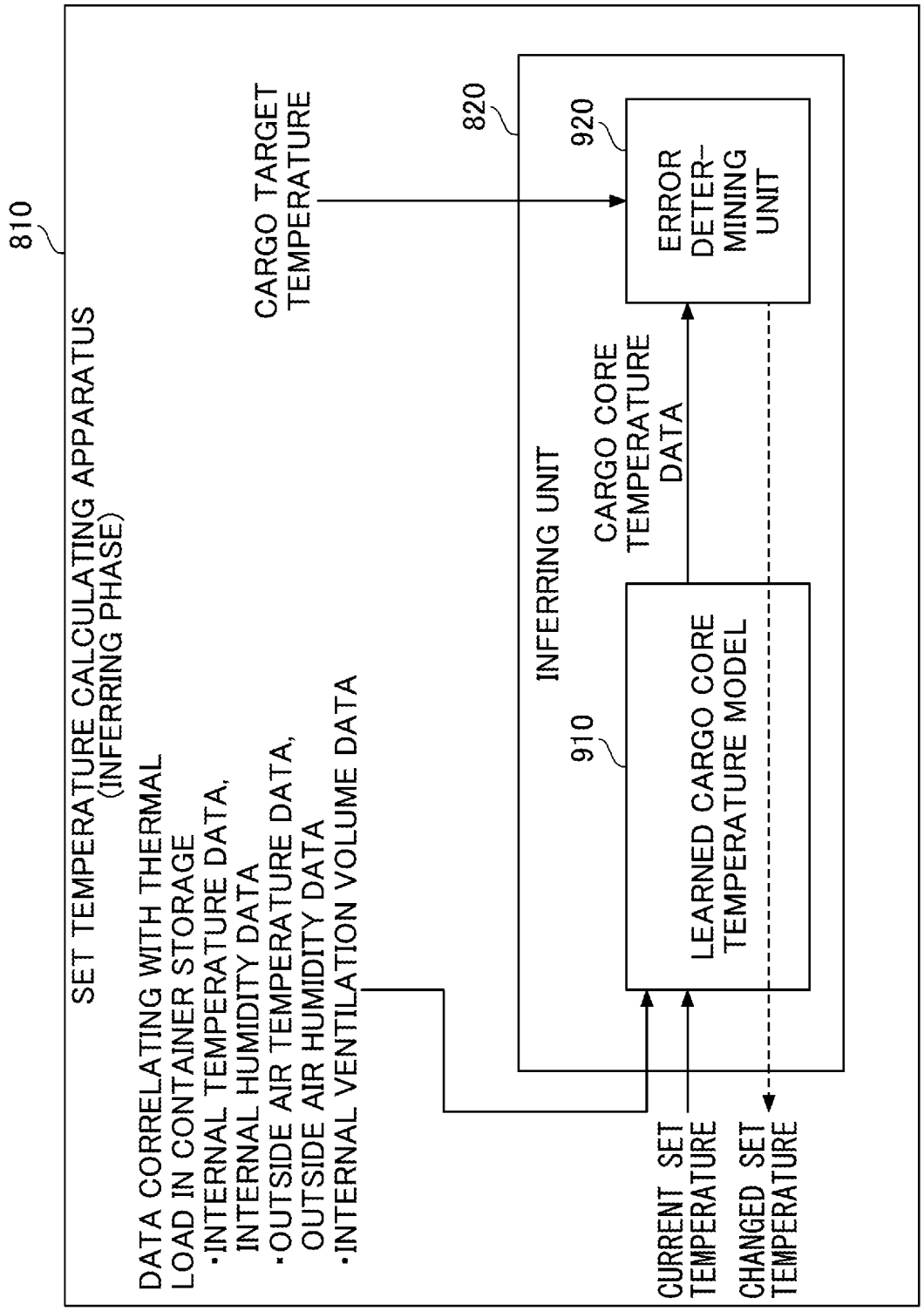
FIG. 9 is a diagram illustrating an example of a functional configuration of the set temperature calculating apparatus in the inferring phase.

Next, within the functional configuration of the set temperature calculating apparatus 810 in the inferring phase, a functional configuration of the inferring unit 820 of will be described in detail. FIG. 9 is a diagram illustrating an example of the functional configuration of the set temperature calculating apparatus in the inferring phase.

As illustrated in FIG. 9, the inferring unit 820 includes a learned cargo core temperature model 910 and an error determining unit 920.

The inferring unit 820 obtains data correlating with the heat load in the container storage 120 from the respective units of the internal temperature obtaining unit 311 to the internal ventilation volume obtaining unit 315. The data correlating with the heat load in the container storage 120 obtained by the inferring unit 820 is different from the data used when the learning unit 320 performs machine learning.

Also, the inferring unit 820 obtains the current set temperature set to the refrigerator control apparatus 332 from the input information obtaining unit 817.

By inputting into the learned cargo core temperature model 910 a data set including a combination of the obtained data correlating with the thermal load in the container storage 120 and the obtained current set temperature, the inferring unit 820 executes the learned cargo core temperature model 910. Thus, the learned cargo core temperature model 910 infers the cargo core temperature data after the predetermined time.

The error determining unit 920 obtains the cargo target temperature from the input information obtaining unit 817. Also, the error determining unit 920 calculates the error between the cargo core temperature data after the predetermined time inferred by the learned cargo core temperature model 910 and the cargo target temperature obtained by the input information obtaining unit 817.

By backpropagation of the error calculated by the error determining unit 920, the learned cargo core temperature model 910 changes the current set temperature input to the learned cargo core temperature model 910 and obtains the changed set temperature.

Thus, the low temperature treatment system 800 changes the set temperature to eliminate the error between
- cargo core temperature data after a predetermined time inferred based on a data set containing a combination of data correlating with the thermal load in the container storage 120 and a current set temperature; and
- a cargo target temperature.

This enables the low temperature treatment system 800 to derive the current appropriate set temperature for achieving the appropriate cargo core temperature data after the predetermined time.

In the above description, the inferring unit 820 inputs, as data correlating with the heat load in the container storage 120, the internal temperature data, the internal humidity data, the outside air temperature data, the outside air humidity data, and the internal ventilation volume data to the learned cargo core temperature model 910. However, when the learned cargo core temperature model 910 is generated based on the data of a portion of the internal temperature data, the inferring unit 820 inputs the data of the portion to the learned cargo core temperature model 910.

<Flow of Set Temperature Calculating Process>

Figure 10:
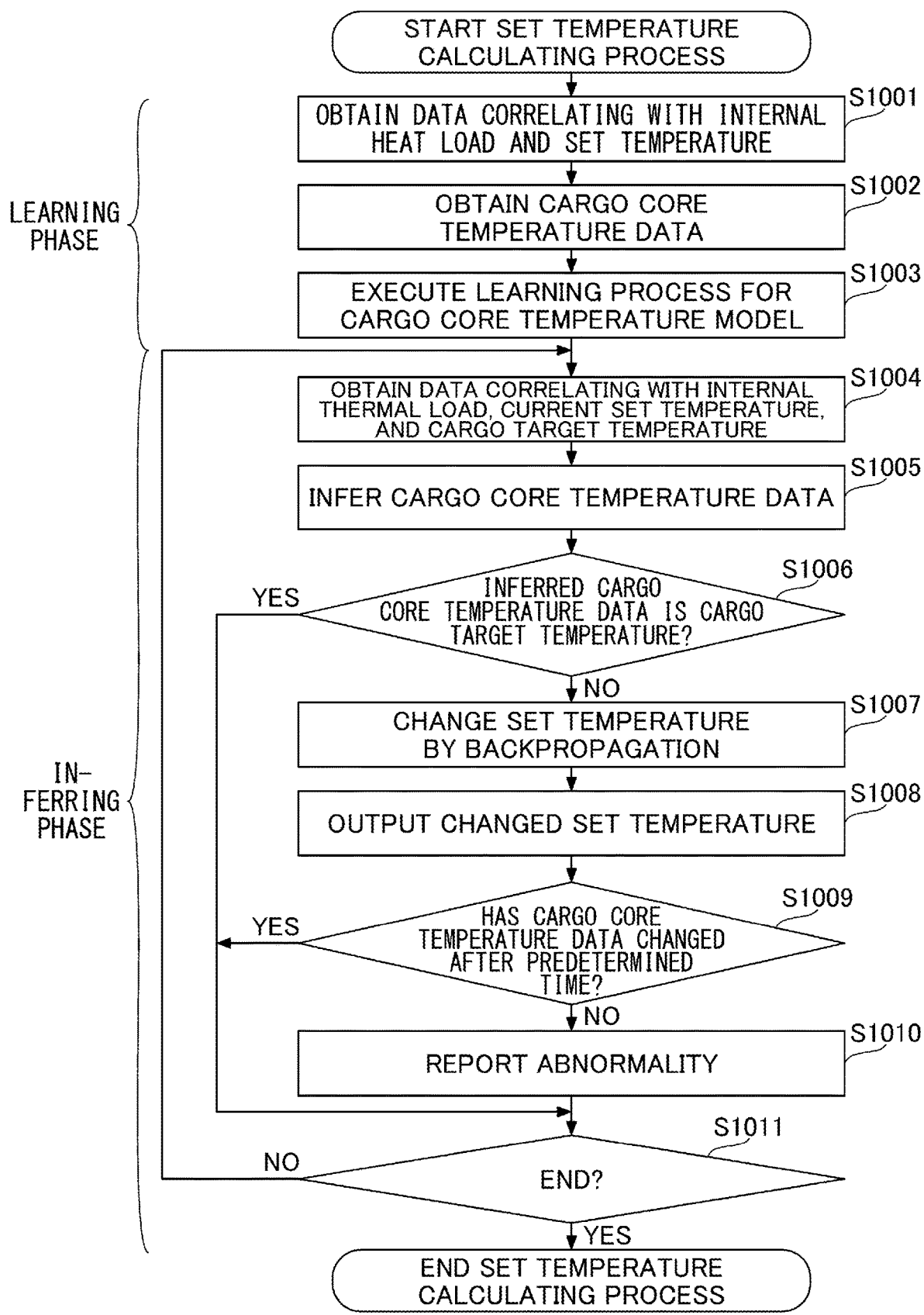
FIG. 10 is a flowchart illustrating a flow of a set temperature calculating process performed by the set temperature calculating apparatus.

Next, a flow of the set temperature calculating process by the set temperature calculating apparatus 310 in the learning phase and the set temperature calculating apparatus 810 in the inferring phase will be described. FIG. 10 is a flowchart illustrating the flow of the set temperature calculating process performed by the set temperature calculating apparatus according to the first embodiment.

In step S1001, each of the units from the internal temperature obtaining unit 311 to the internal ventilation volume obtaining unit 315 obtains data correlating with the heat load in the container storage 120. The input information obtaining unit 317 obtains the set temperature.

In step S1002, the cargo core temperature obtaining unit 316 obtains the cargo core temperature data.

In step S1003, by inputting a data set including a combination of the data correlating with the thermal load in the container storage 120 and the set temperature to the cargo core temperature model 701, the learning unit 320 executes the cargo core temperature model 701. The learning unit 320 then performs machine learning on the cargo core temperature model 701 so as to make the cargo core temperature data output by the cargo core temperature model 701 closer to the cargo core temperature data (correct data) obtained after a predetermined time by the cargo core temperature obtaining unit 316. Thus, the learning unit 320 generates a learned cargo core temperature model. The generated learned cargo core temperature model is incorporated into the set temperature calculating apparatus 810 in the inferring phase.

In step S1004, the inferring unit 820 obtains the data correlating with the thermal load in the container storage 120, the current set temperature, and the cargo target temperature.

In step S1005, by inputting a data set including a combination of the data correlating with the thermal load in the container storage 120 and the current set temperature to the learned cargo core temperature model 910, the inferring unit 820 executes the learned cargo core temperature model 910. Thus, the inferring unit 820 infers the cargo core temperature data after a predetermined time.

In step S1006, the inferring unit 820 calculates an error between the inferred cargo core temperature data after the predetermined time and the cargo target temperature and determines whether the calculated error is equal to or more than a predetermined threshold value. In a case of determining in step S1006 that the calculated error is less than the predetermined threshold value (in a case of YES in step S1006), the process proceeds to step S1011.

Meanwhile, in a case of determining in step S1006 that the calculated error is greater than or equal to the predetermined threshold value (in a case of NO in step S1006), the process proceeds to step S1007. In step S1007, the inferring unit 820 changes by backpropagation the current set temperature input to the learned cargo core temperature model 910 and obtains the changed set temperature.

In step S1008, the set temperature output unit 830 reports the changed set temperature to the refrigerator control apparatus 332.

In step S1009, after the changed set temperature is reported by the set temperature output unit 830, during a predetermined time, the reporting unit 840 monitors the cargo core temperature data and determines whether the cargo core temperature data has changed.

In a case of determining in step S1009 that the cargo core temperature data has changed (in a case of YES in step S1009), the process proceeds to step S1011. Meanwhile, in a case of determining in step S1009 that the cargo core temperature data has not changed even after the predetermined time (in a case of NO in step S1009), the process proceeds to step S1010.

In step S1010, the reporting unit 840 reports an abnormality to the refrigerator display apparatus 270 of the container storage 120. The reporting unit 840 reports the abnormality to the management terminal 850.

In step S1011, the inferring unit 820 determines whether to end the set temperature calculating process. In a case of determining in step S1011 to continue the set temperature calculating process (in a case of NO in step S1011), the process returns to step S1004.

Meanwhile, in a case of determining in step S1011 to end the set temperature calculating process (in a case of YES in step S1011), the set temperature calculating process ends.

In the example of FIG. 10, a case is described in which the learning unit 320 performs batch learning such that model parameters are changed by inputting a data set including a combination of data correlating with the thermal load in the container storage 120 and a set temperature to the cargo core temperature model 701. However, the learning unit 320 may perform sequential learning such that model parameters are changed by sequentially inputting a predetermined number of data sets including a combination of data correlating with the thermal load in the container storage 120 and a set temperature to the cargo core temperature model 701

<Summary>

As is obvious from the above description, the set temperature calculating apparatus according to the first embodiment learns cargo core temperature data after a predetermined time according to a data set including a combination of and data correlating with the heat load in the container storage and a set temperature; and inputs a newly obtained data set including a combination of data correlating with the heat load in the container storage and a set temperature to the learning results to infer the cargo core temperature data after the predetermined time; and by backpropagation an error between the inferred cargo core temperature data after the predetermined time and a cargo target temperature predetermined based a cargo reference temperature, changes the set temperature to calculate the changed set temperature.

Thus, the set temperature calculating apparatus according to the first embodiment can calculate the set temperature for controlling the cargo core temperature after the predetermined time to an appropriate temperature in accordance with the change in the heat load in the container storage. As a result, according to the first embodiment, a set temperature calculating apparatus, a low temperature treatment system, a set temperature calculating method, and a set temperature calculating program for realizing a low temperature treatment can be provided.

Second Embodiment

In the first embodiment described above, the location of the set temperature calculating apparatus is not specifically mentioned, but the set temperature calculating apparatus is located as desired. For example, the set temperature calculating apparatus 310 in the learning phase may be installed on or outside the container ship 110. In a case of being located outside the container ship 110, the set temperature calculating apparatus 310 may be configured to receive a list 400 of received data in real time via a network.

Alternatively, the learning information storage unit 318 may be disposed on the container ship 110, the learning information 410 may be temporarily stored, and the set temperature calculating apparatus 310 may be configured to receive the stored learning information 410 via a network.

Alternatively, the set temperature calculating apparatus 310 may be configured to obtain the learning information 410 by connecting the learning information storage unit 318 to the set temperature calculating apparatus 310 after completion of marine transport by the container ship 110.

Similarly, the set temperature calculating apparatus 810 in the inferring phase may be installed on the container ship 110 or installed outside the container ship 110. In a case of being installed outside the container ship 110, the set temperature calculating apparatus 310 may be configured to receive the list 400 of received data in real time via a network.

Alternatively, the respective units of the internal temperature obtaining unit 311 to the input information obtaining unit 317 may be disposed on the container ship 110, and the respective units of the inferring unit 820, the set temperature output unit 830, and the reporting unit 840 may be installed outside the container ship 110.

The set temperature calculating apparatus 310 in the learning phase and the set temperature calculating apparatus 810 in the inferring phase may be integrally configured or may be separately configured.

In the first embodiment described above, data at a specific time is input as the data correlating with the thermal load in the container storage 120 inputted to the cargo core temperature model 701 or the learned cargo core temperature model 910.

However, the data correlating the thermal load in the container storage 120 input to the cargo core temperature model 701 or the learned cargo core temperature model 910 may be time series data having a predetermined time range. Alternatively, it may be a conversion value of time series data having a predetermined time range. Here, the conversion value of time series data means a value converted by performing some kind of operation on time series data, such as the average value, the maximum value, or the minimum value of time series data.

In the first embodiment described above, the external temperature sensor 281 and the external humidity sensor 282 are exemplified as the external sensor group 350, but sensors that measure measurement items other than temperature or humidity may be mounted.

In the first embodiment described above, the details of the model (cargo core temperature model) that is used in machine learning are not specifically mentioned, but a suitable type of model is applied to a model that is used in machine learning. Specifically, a suitable type of model is applied, such as a NN (Neural Network) model, a random forest model, or a SVM (Support Vector Machine) model.

In the first embodiment, no details of the method of changing model parameters when changing model parameters based on the results of comparison by the comparing and changing are described. However, the method of changing model parameters by the comparing and changing is according to the model type.

Although a description has been given of the embodiments, it may be understood that various modifications may be made to the configurations and details thereof, without departing from the spirit and scope of claims.

This application is based on and claims priority to Japanese Patent Application No. 2019-052014 filed on Mar. 19, 2019, and Japanese Patent Application No. 2020-42822 filed on Mar. 12, 2020 and the entire contents of the Japanese Patent Applications are incorporated herein by reference.

DESCRIPTION OF REFERENCE SYMBOLS

110: Container ship
120: Container storage
130: Low temperature treatment conditions
200: Refrigerator
201: Suction temperature sensor
202: Humidity sensor
203: Discharge temperature sensor
211: Evaporator temperature sensor
212: Evaporator pressure sensor
221: Outside air temperature sensor
222: Outside air humidity sensor
231: Condenser temperature sensor
232: Condenser pressure sensor
251 to 253: Cargo core temperature sensors
300: Low temperature treatment system
311: Internal temperature obtaining unit
312: Internal humidity obtaining unit
313: Outside air temperature obtaining unit
314: Outside air humidity obtaining unit
315: Internal ventilation volume obtaining unit
316: Cargo core temperature obtaining unit
317: Input information obtaining unit
320: Learning unit
331: Refrigerator input apparatus
332: Refrigerator control apparatus
333: Refrigerant circuit
701: Cargo core temperature model
800: Low temperature treatment system
810: Set temperature calculating apparatus
817: Input information obtaining unit
820: Inferring unit
830: Set temperature output
840: Reporting unit
910: Learned cargo core temperature model
920: Error determining unit

The invention claimed is:

1. A set temperature calculating apparatus comprising:
a memory; and
a processor coupled to the memory and configured to:
obtain data correlating with a heat load in a container storage;
obtain a set temperature when performing temperature control in the container storage; and
learn a cargo core temperature in the container storage according to a data set including a combination of the data correlating with the heat load and the set temperature.

2. The set temperature calculating apparatus according to claim 1, wherein the processor is further configured to change a predetermined set temperature based on a difference between an inferred cargo core temperature and a target temperature of the cargo core temperature in the container storage, the inferred cargo core temperature being inferred by inputting monitored data correlating with the heat load in the container storage and the predetermined set temperature into a result of the learning, and the target temperature being determined based on a low temperature treatment condition.

3. The set temperature calculating apparatus according to claim 2, wherein the data correlating with the heat load includes any of temperature data and humidity data in the container storage, a ventilation volume in the container storage, and outside air temperature data and outside air humidity data outside the container storage.

4. The set temperature calculating apparatus according to claim 3, wherein the temperature data and the humidity data in the container storage are output by a suction temperature sensor, a discharge temperature sensor, and a humidity sensor installed on a refrigerator included by the container storage.

5. The set temperature calculating apparatus according to claim 3, wherein the temperature data in the container storage is calculated based on temperature data and pressure data output by a temperature sensor and a pressure sensor installed on an evaporator of a refrigerator included by the container storage.

6. The set temperature calculating apparatus according to claim 3, wherein the outside air temperature data and the outside air humidity data outside the container storage are output by an outside air temperature sensor and an outside air humidity sensor installed on a refrigerator included by the container storage or an outside air temperature sensor and an outside air humidity sensor installed separately from the refrigerator included by the container storage.

7. The set temperature calculating apparatus according to claim 3, wherein the outside air temperature data outside the container storage is calculated based on temperature data and pressure data output by a temperature sensor and a pressure sensor installed on a condenser of a refrigerator included by the container storage.

8. A low temperature treatment system comprising:
the set temperature calculating apparatus according to claim 2; and
a control apparatus configured to control a refrigerator included by the container storage so as to make a temperature in the container storage closer to the set temperature changed by the processor.

9. The low temperature treatment system according to claim 8, wherein the processor is further configured to report abnormality when the cargo core temperature in the container storage does not change, even after a predetermined time has elapsed since control was started by the control apparatus so as to make the temperature in the container storage closer to the set temperature changed by the processor.

10. The low temperature treatment system of claim 8, wherein the refrigerator includes a refrigerant circuit including a compressor, a condenser, an expansion mechanism, and an evaporator; a suction temperature sensor; a discharge temperature sensor; a humidity sensor; an outside air temperature sensor; an outside air humidity sensor; and a cargo core temperature sensor.

11. A set temperature calculating method comprising:
obtaining data correlating with a heat load in a container storage;
obtaining a set temperature when performing temperature control in the container storage; and
learning a cargo core temperature in the container storage according to a data set including a combination of the data correlating with the heat load and the set temperature.

12. The set temperature calculating method according to claim 11, further comprising:
changing the predetermined set temperature based on the difference between an inferred cargo core temperature and a target temperature of the cargo core temperature in the container storage, the inferred cargo core temperature being inferred by inputting monitored data correlating with the heat load in the container storage and the predetermined set temperature into a result of the learning, and the target temperature being determined based on a low temperature treatment condition.

13. A non-transitory recording medium storing a set temperature calculating program for causing a computer to execute a process comprising:
obtaining data correlating with a heat load in a container storage;
obtaining a set temperature when performing temperature control in the container storage; and
learning a cargo core temperature in the container storage according to a data set including a combination of the data correlating with the heat load and the set temperature.

14. The non-transitory recording medium storing the set temperature calculating program according to claim 13, wherein the process further comprising changing the predetermined set temperature based on the difference between an inferred cargo core temperature and a target temperature of the cargo core temperature in the container storage, the inferred cargo core temperature being inferred by inputting monitored data correlating with the heat load in the container storage and the predetermined set temperature into a result of the learning, and the target temperature being determined based on a low temperature treatment condition.

* * * * *